United States Patent
Papachristou et al.

(10) Patent No.: US 9,037,591 B1
(45) Date of Patent: May 19, 2015

(54) STORING TERM SUBSTITUTION INFORMATION IN AN INDEX

(75) Inventors: Dimitra Papachristou, Palo Alto, CA (US); Phuong B. Nguyen, Milpitas, CA (US)

(73) Assignee: Google Inc., Mountain View, CA (US)

( * ) Notice: Subject to any disclaimer, the term of this patent is extended or adjusted under 35 U.S.C. 154(b) by 268 days.

(21) Appl. No.: 13/460,582

(22) Filed: Apr. 30, 2012

(51) Int. Cl.
*G06F 17/30* (2006.01)

(52) U.S. Cl.
CPC .... *G06F 17/30321* (2013.01); *G06F 17/30616* (2013.01)

(58) Field of Classification Search
CPC .............. G06F 17/30616; G06F 17/30864
USPC ........................................................ 707/741
See application file for complete search history.

(56) References Cited

U.S. PATENT DOCUMENTS

| | | |
|---|---|---|
| 7,346,490 B2 | 3/2008 | Fass et al. |
| 2002/0032566 A1* | 3/2002 | Tzirkel-Hancock et al. . 704/241 |
| 2003/0120846 A1* | 6/2003 | Clapper ........................ 710/100 |
| 2005/0149499 A1* | 7/2005 | Franz et al. ....................... 707/3 |
| 2010/0179801 A1* | 7/2010 | Huynh et al. ..................... 704/1 |
| 2013/0151501 A1* | 6/2013 | Wang et al. ................... 707/711 |

FOREIGN PATENT DOCUMENTS

WO  WO 03/042859  5/2003

\* cited by examiner

*Primary Examiner* — Jensen Hu
(74) *Attorney, Agent, or Firm* — Fish & Richardson P.C.

(57) ABSTRACT

Methods, systems, and apparatus, including computer programs encoded on a computer storage medium, for storing, in an index associated with a document, a particular term that occurs in the document, wherein the particular term comprises n words, and wherein n is greater than 1; identifying a substitute term of the particular term; and in response to identifying the substitute term of the particular term, storing, in the index associated with the document, (i) the substitute term of the particular term, and (ii) data indicating that the substitute term spans the n words of the particular term.

12 Claims, 6 Drawing Sheets

STORING TERM SUBSTITUTION INFORMATION IN AN INDEX

BACKGROUND

This specification generally relates to search engines, and one particular implementation relates to evaluating substitute terms or substitution rules that are used in revising search queries.

To identify documents that are responsive to search queries, a search engine may match query terms, or substitute terms of the query terms, with terms that occur in the documents, or with terms that occur in metadata associated with the documents.

SUMMARY

Documents containing substitute terms for one or more original query terms (e.g., unrevised query terms) of a search query can be identified based on information stored in an index. In particular, the substitute terms for the query terms can be stored in an index associated with a document containing the substitute terms. Additionally, substitution information for substituting, in the document, the query terms with the substitute terms can be stored in the index.

The substitution information can specify that the substitute term spans n words of the query term, when the query term includes more than one word. The substitution information can store each of the m words of the substitute term of the query term, and (ii) for each of the m words of the substitute term, data indicating an order of the word within the m words of the substitute term. Based on the stored substitution information, the query terms can be looked up, in the index, to identify responsive documents that do not include the query terms, without having to revise the search query containing the query terms.

In general, one aspect of the subject matter described in this specification may be embodied in methods that store, in an index associated with a document, a particular term that occurs in the document, wherein the particular term comprises n words, and where n is greater than 1; identify a substitute term of the particular term; and in response to identifying the substitute term of the particular term, store, in the index associated with the document, (i) the substitute term of the particular term in the index associated with the document, and (ii) data indicating that the substitute term spans the n words of the particular term. Other embodiments of this aspect include corresponding systems, apparatus, and computer programs, configured to perform the actions of the methods, encoded on computer storage devices.

These and other embodiments can each optionally include one or more of the following features. The substitute term includes m words, and where m is greater than 1; and where the storing, in the index associated with the document, further includes: storing (i) each of the m words of the substitute term of the particular term, and (ii) for each of the m words of the substitute term of the particular term, data indicating an order of the word within the m words of the substitute term. The method further includes storing, in the index associated with the document, a reference to the document in which the particular term occurs. A substitute term for the particular term is identified based in part on a document context of the particular term in the document. The method further includes storing, in the index associate with the document, information indicating that the substitute term of the particular term is (i) a substitute term of the particular term, or (ii) is not a term that occurs in the document.

In general, another aspect of the subject matter described in this specification may be embodied in methods that store, in an index associated with a document, a particular term that occurs in the document; identify a substitute term of the particular term, wherein the substitute term comprises n words, and wherein n is greater than 1; and in response to identifying the substitute term of the particular term, store, in the index associated with the document, (i) each of the n words of the substitute term of the particular term, and (ii) for each of the n words of the substitute term of the particular term, data indicating an order of the word within the n words of the substitute term. Other embodiments of this aspect include corresponding systems, apparatus, and computer programs, configured to perform the actions of the methods, encoded on computer storage devices.

These and other embodiments can each optionally include one or more of the following features. The particular term includes m words, where m is greater than 1, and where the storing, in the index associated with the document, further includes: storing, for each of the n words of the substitute term of the particular term, data indicating that the word spans the m words of the particular term. The method further comprises: storing, in the index associated with the document, a reference to the document in which the particular term occurs. A substitute term for the particular term is identified based in part on a document context of the particular term in the document. The method further includes: storing, in the index associate with the document, information indicating that the substitute term of the particular term is (i) a substitute term of the particular term, or (ii) is not a term that occurs in the document.

Particular embodiments of the subject matter described in this specification can be implemented so as to realize one or more of the following advantages. Substitute terms for particular terms appearing in a document can be stored in an index associated with a document. Substitution information for substituting the particular terms with the substitute terms can be stored in the index. The substitution information can specify that the substitute term spans the n words of the particular term, where the particular term includes more than one word. The substitution information can store each of the m words of the substitute term of the particular term, and (ii) for each of the m words of the substitute term of the particular term, data indicating an order of the word within the m words of the substitute term. Query terms can be looked up in the index to identify responsive documents that do not include the query terms without having to revise the search query containing the query terms. Particular terms that appear in a document, and that have more than one possible substitute term, can be disambiguated using terms appearing in the document (e.g., using terms adjacent to the particular terms). Disambiguating the particular terms using the document context can allow selection of a more appropriate substitute term from the possible substitute terms for a particular term.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
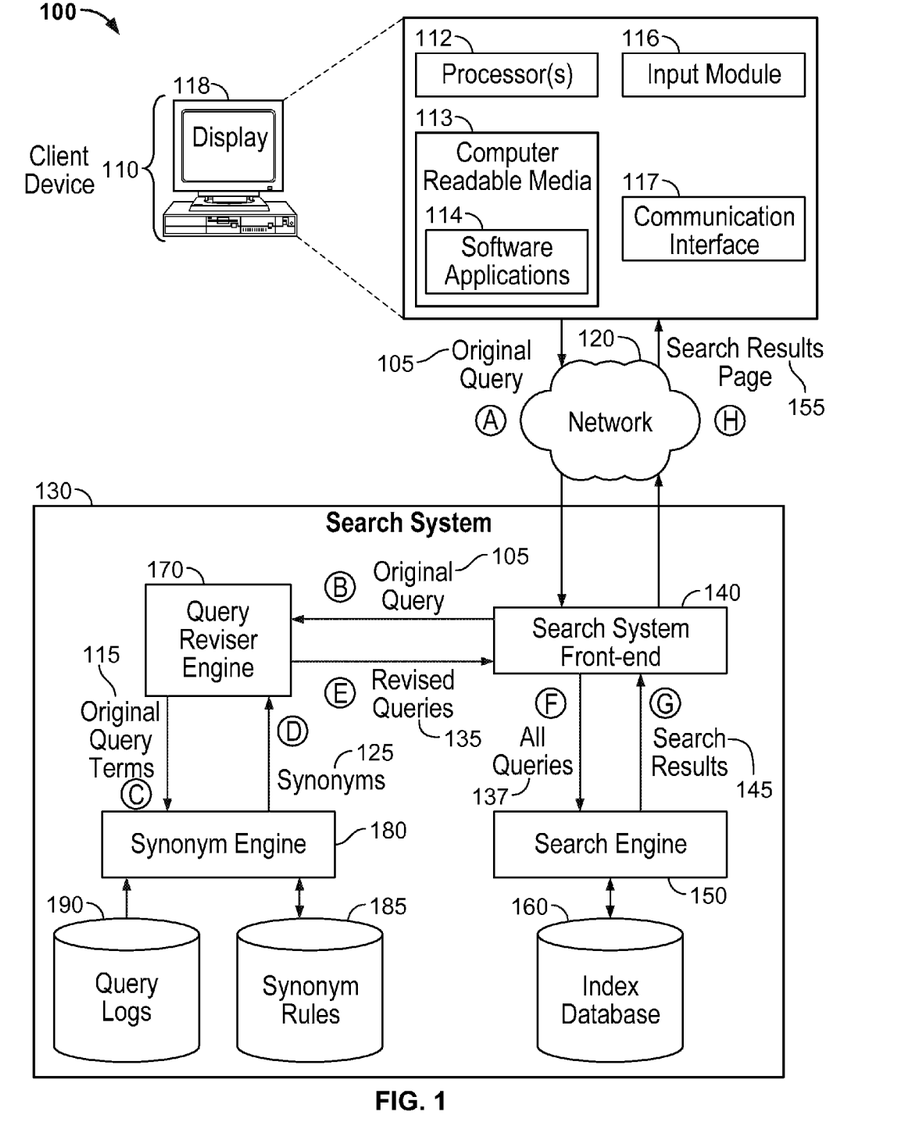
FIG. 1 is a block diagram illustrating an example system that can revise queries using substitute terms.

FIG. 1 is a diagram of an example system 100 that can revise queries using substitute terms. In general, the system 100 includes a client device 110 coupled to a search system 130 over a network 120. The search system 130 includes a search engine 150, a query reviser engine 170, and a substitute term engine 180. The search system 130 receives a query 105, referred to by this specification as the "original search query" or an "initial query," from the client device 110 over the network 120. The search system 130 provides a search results page 155, which presents search results 145 identified as being responsive to the query 105, to the client device 110 over the network 120.

In some implementations, the search results 145 identified by the search system 130 can include one or more search results that are identified as being responsive to queries that are different than the original search query 105. The search system 130 can generate or obtain other queries in numerous ways, e.g., by revising the original search query 105.

In some implementations, the search system 130 can generate a revised search query by adding to the original search query 105 additional terms that are substitute terms of one or more terms that occur in the original search query 105. In other implementations, the search system 130 can generate a revised search query by substituting terms that are substitute terms of terms that occur in the original search query 105, in place of the terms in the original search query 105. The substitute term engine 180 can determine the additional terms that are candidate substitute terms for the one or more terms that occur in the original search query. The query reviser engine 170 can generate the revised search query. The search engine 150 can use the original search query 105 and the revised queries to identify and rank search results. The search engine 150 can provide the identified search results 145 to the client device 110 on the search results page 155.

The substitute term engine 180 can identify the substitute terms that the query reviser engine 170 can use to generate revised queries by evaluating terms included in previously received queries stored in a query logs database 190. The queries stored in the query logs database 190 can include previous queries in which a user considered the results of the queries desirable. For example, the user can click the provided search results from a query, in effect, validating the search results. The queries stored in the query logs database 190 can include previous queries determined to provide desirable results by the search system 130. For example, the search system 130 can perform a quality thresholding for returned search results from a query. The quality thresholding can include determining search results that have historically been returned for a particular query, and filtering those results that do not satisfy predetermined quality criteria. Search results above the quality threshold can validate a query, which the search system 130 can then include in the query logs database 190.

In particular, a "substitute term" can also be referred to as a "synonym." Additionally, a "substitution rule" can also be referred to as a "synonym rule."

Given a first term ("cat"), the substitute term engine 180 can evaluate terms ("feline" or "banana") that are candidate substitute terms for the original term. In addition, the substitute term engine 180 can determine that certain terms are substitute terms of the first term (as in the case of "feline"), and that other terms are not substitute terms of the first term (as in the case of "banana"). The substitute term engine 180 can base this determination on rules stored in a substitute term rules database 185. For example, a substitute term rule can be "feline" is a substitute term for cat and "banana" is not a substitute term for cat.

The search system 130 can define substitute term rules to apply generally, or to apply only when particular conditions, or "query contexts," are satisfied. For example, the query context of a substitute term rule can specify one or more other terms that should be present in the query for the substitute term rule to apply. Furthermore, query contexts can specify relative locations for the other terms (e.g., to the right or left of a query term under evaluation). In another example, query contexts can specify a general location (e.g., anywhere in the query). For example, a particular substitute term rule can specify that the term "pet" is a substitute term for the query term "dog," but only when the query term "dog" is followed by the term "food" in the query. Multiple distinct substitute term rules can generate the same substitute term for a given query term. For example, for the query term "dog" in the query "dog food," the term "pet" can be specified as a substitute term for "dog" by both a substitute term rule for "dog" in the general context and a substitute term rule for "dog" when followed by "food."

The substitute term rules can depend on query contexts that define other terms in the original search query 105. In other words, a substitute term rule need not apply in all situations. For example, when the term "cats" is used as a single-term query, the term "felines" can be considered a substitute term for "cats". The substitute term engine 180 can return the term "felines" to the query reviser engine 170 to generate a revised search query. In another example, when the query includes the term "cats" followed by the term "musical," a substitute term rule can specify that the term "felines" is not a substitute term for "cats." In some implementations, the substitute term rules can be stored in the substitute term rules database 185 for use by the substitute term engine 180, the query reviser engine 170, or the search engine 150.

In the illustrative example of FIG. 1, the search system 130 can be implemented as computer programs installed on one or more computers in one or more locations that are coupled to each other through a network (e.g., network 120). The search system 130 includes a search system front-end 140 (e.g., a "gateway server") that coordinates requests between other parts of the search system 130 and the client device 110. The search system 130 also includes one or more "engines": the search engine 150, a query reviser engine 170, and the substitute term engine 180.

As used in this specification, an "engine" (or "software engine") refers to a software implemented input/output system that provides an output that is different from the input. An engine can be an encoded block of functionality, such as a library, a platform, a Software Development Kit ("SDK"), or an object. The network 120 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, the search engine 150, the query reviser engine 170, and the substitute term engine 180 can be implemented on any appropriate type of computing device (e.g., servers, mobile phones, tablet computers, notebook computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g., a browser or layout engine), an input module 116 (e.g., a keyboard or mouse), a communication interface 117, and a display device 118. The computing device or devices that implement the search system front-end 140, the query reviser engine 170, and the search engine 150 may include similar or different components.

In general, the search system front-end 140 receives the original search query 105 from the client device 110. The search system front-end 140 routes the original search query 105 to the appropriate engines included in the search system 130 so that the search system 130 can generate the search results page 155. In some implementations, routing occurs by referencing static routing tables. In other implementations, routing occurs based on the current network load of an engine, in order to accomplish load balancing. In addition, the search system front-end 140 can provide the resulting search results page 155 to the client device 110. In doing so, the search system front-end 140 acts as a gateway, or interface, between the client device 110 and the search engine 150.

Two or more of a search system front-end, a query reviser engine and a search engine (e.g., the search system front-end 140, the query reviser engine 170, and the search engine 150, respectively) may be implemented on the same computing device, or on different computing devices. Because the search system 130 generates the search results page 155 based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted query 105.

In some implementations, the search system 130 can include many computing devices for implementing the functionality of the search system 130. The search system 130 can process the received queries and generate the search results by executing software on the computing devices in order to perform the functions of the search system 130.

Referring to FIG. 1, during state (A), a user of the client device 110 enters original search query terms 115 for the original search query 105, and the client device 110 communicates the original search query 105 to the search system 130 over the network 120. For example, the user can submit the original search query 105 by initiating a search dialogue on the client device 110, speaking or typing the original search query terms 115 of the original search query 105, and then pressing a search initiation button or control on the client device 110. The client device 110 formulates the original search query 105 (e.g., by specifying search parameters). The client device 110 transmits the original search query 105 over the network 120 to the search system 130.

Although this specification refers to the query 105 as an "original" or an "initial" query, such reference is merely intended to distinguish this query from other queries, such as the revised queries that are described below. The designation of the original search query 105 as "original" is not intended to require the original search query 105 to be the first query that is entered by the user, or to be a query that is manually entered. For example, the original search query 105 can be the second or subsequent query entered by the user. In another example, the original search query 105 can be automatically derived (e.g., by the query reviser engine 170). In another example, the original search query 105 can be modified based on prior queries entered by the user, location information, and the like.

During state (B), the search system front-end 140 receives the original search query 105 and communicates the original search query 105 to the query reviser engine 170. The query reviser engine 170 can generate one or more revised queries 135 based on the substance of the original search query 105. In some implementations, the query reviser engine 170 generates a revised search query by adding terms to the original search query 105 using substitute terms 125 for terms in the original search query 105. In other implementations, the query reviser engine 170 generates a revised search query by substituting the substitute terms 125 for the corresponding terms of the original search query 105. The query reviser engine 170 can obtain substitute terms 125 for use in revising the original search query 105 from the substitute term engine 180.

During state (C), the query reviser engine 170 communicates original search query terms 115 of the original search query 105 to the substitute term engine 180. The substitute term engine 180 can use substitute term rules included in the substitute term rules database 185 to determine one or more substitute terms 125 for one or more of the original search query terms 115 of the original search query 105.

The substitute term engine 180 communicates substitute terms 125 to the query reviser engine 170 during state (D). The query reviser engine 170 generates one or more revised queries 135 by adding substitute terms 125 to the original search query 105. In addition, the query reviser engine 170 can generate one or more revised queries 135 by substituting certain terms of the original search query 105.

The query reviser engine 170 communicates the one or more revised queries 135 to the search system front-end 140 during state (E). The search system front-end 140 communicates the original search query 105 along with the one or more revised queries 135 to the search engine 150 as all queries 137 during state (F). The search engine 150 generates search results 145 that it identifies as being responsive to the original search query 105 and/or the one or more revised queries 135. The search engine 150 can identify search results 145 for each query using an index 160 that stores indexed documents (e.g., web pages, images, or news articles on the Internet). The search engine 150 can combine and rank the identified search results 145 and communicate the search results 145 to the search system front-end 140 during state (G).

The search system front-end 140 generates a search results page 155 that identifies the search results 145. For example, each of the search results 145 can include, but are not limited to, titles, text snippets, images, links, reviews, or other information. The original search query terms 115 or the substitute terms 125 that appear in the search results 145 can be formatted in a particular way (e.g., in bold print and/or italicized print). For example, the search system front-end 140 transmits a document that includes markup language (e.g., HyperText Markup Language or eXtensible Markup Language) for the search results page 155 to the client device 110 over the network 120 at state (H). The client device 110 reads the document (e.g., using a web browser) in order to display the search results page 155 on display device 118. The client device 110 can display the original search query terms 115 of the original search query 105 in a query box (or "search box"), located, for example, on the top of the search results page 155. In addition, the client device 110 can display the search results 145 in a search results box, for example, located on the left-hand side of the search results page 155.

Figure 2:
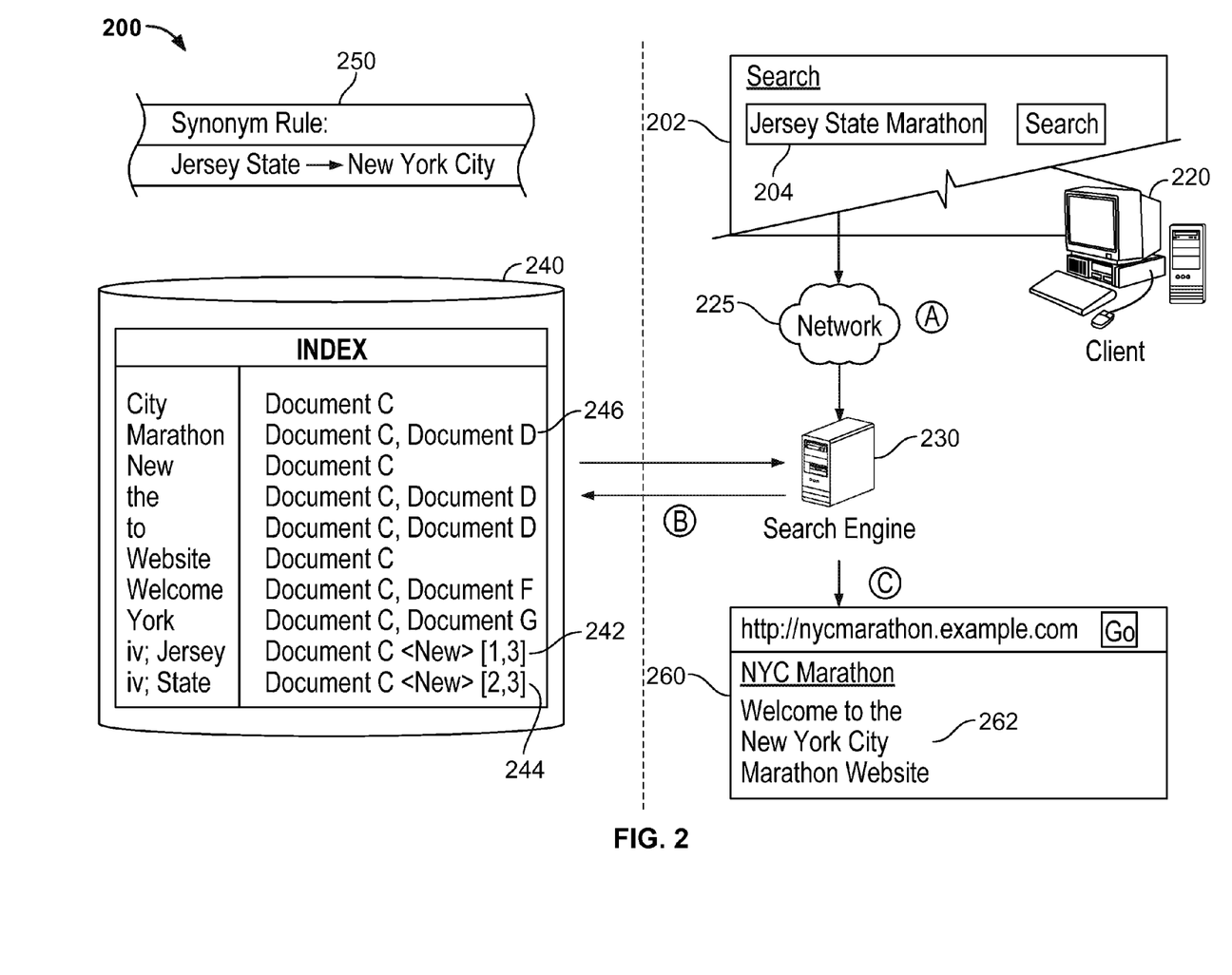
FIG. 2 is a block diagram of an example system that can revise queries using substitution information stored in an index.

FIG. 2 is a block diagram of an example system 200 that can revise queries using substitution information 242 and 244 stored in an index 240. Among other components, the system 200 includes a client device 220, a search engine 230, and an index 240.

A user operating the client device 220 enters query terms 204 ("jersey state marathon") through a search engine home page 202. The client device 220 communicates the query terms 204 over a network 225 to the search engine 230 during state (A).

The search engine 230 uses an index 240 to identify search results responsive to the query terms 204 during state (B). The index 240 can store information about documents (e.g., web pages, images, or news articles on the Internet). In some implementations, the index 240 can store a list of terms that appear in documents along with references to those documents. For example, as shown in the example index 240, the term "marathon" 246 appears in documents "Document C" and "Document D."

In some implementations, the search engine 230 can identify search results responsive to particular query terms by looking up the particular query terms in the index 240 and identifying documents that contain the particular query terms. For example, the search engine 230 can use the index 240 to identify documents "Document C" and "Document D" as being responsive to a query term "marathon" 246.

Substitute terms for particular terms that occur in a document can be stored in an index associated with the document. In some implementations, the index 240 can store a substitute term for a particular term that occurs in documents, the particular term, and references to the documents that contain the particular term.

For example, an index can store a substitute term "manhattan" for a particular term "city" that appears in documents "Document C" and "Document D," the particular term "city," and references to the documents "Document C" and "Document D" that contain the particular term "city."

A search engine can use the index to identify responsive documents by matching, in the index, a search query term with substitute terms for particular terms that appear in documents. If the search query term matches a substitute term for a particular term, then the documents in which that particular term occurs can be identified as being responsive to the search query. In other words, if a search query term "manhattan" matches a substitute term "manhattan" for a particular term "city," then the documents (e.g., "Document C" and "Document D") in which that particular term "city" occurs can be identified as being responsive to the search query.

In some implementations, substitute terms stored in the index 240 can be designated using a specified flag (e.g., "iv"). For example, a flag prepended to a substitute term in the index 240 (e.g., "iv; jersey") can indicate that the substitute term is a synonym for a particular term that occurs in a document that is referenced by the index 240. In particular, the flag can indicate that the substitute term is a term that does not appear in a referenced document. The substitute term engine can choose to score occurrences of substitute terms in the documents differently than occurrences of query terms in the documents.

In some implementations, substitute term rules can be used to identify substitute terms for particular terms that appear in documents. For example, the system can use a substitute term rule 250 that specifies that a term "new york city" is a substitute term for a query term "jersey state" to identify "jersey state" as a substitute term for the particular term "new york city."

In FIG. 2, a substitute term "jersey state" is stored in the index 240. In some implementations, substitute terms that include more than one word can be stored in the index 240 using separate index entries for each word in the substitute term. In the index 240, the substitute term "jersey state" is stored using index entries 242 and 244, respectively.

In some implementations, each index entry can store (i) a particular word in the substitute term for a particular term that appears in one or more documents, (ii) the particular term, (iii) references to the documents that include the particular term, and (iv) substitution information for substituting the substitute term for the particular term in the documents in which that particular term occurs.

In some implementations, the substitution information can specify, for each of the n words of the substitute term of the particular term, data indicating an order of the word within the n words of the substitute term. In some implementations, the substitution information can specify data indicating that the substitute term spans the n words of the particular term.

For example, index entry 242 indicates that the word "jersey" is a substitute term for a particular term "new" that appears in a document "Document C." The index entry 242 also indicates that the word "jersey" has an order of "1" and spans "3" words of the particular term "new." The index entry 244 indicates that the word "state" is a substitute term for a particular term "new" that appears in a document "Document C." The index entry 244 also indicates that the word "state" has an order of "2" and spans "3" words of the particular term "new."

In effect, the index entries 242 and 244 provide that instances of the particular term "new" appearing in the indexed document "Document C" are substituted with the substitute term "jersey state," where the substitution spans three words. For example, the substitute term "jersey state" be substituted for instances of a term "new york city" appearing in the document "Document C."

In particular, the search engine 230 can look up the original query terms 204 ("jersey state marathon") in the index 240 to locate the index entries 242 and 244. The search engine 230 can use the index entries 242 and 244 to identify "Document C" as being responsive to the query terms "jersey state".

The search engine 230 provides the document "Document C" that was identified using the index 240 during state (C). The user interface 260 depicts a document 262 (e.g., "Document C") that was identified based on an application of the index entries 242 and 244. Although the document 262 makes no mention of the terms "jersey state," it can be identified as being responsive to an unrevised search query containing the query terms 204 based on an application of the index entries 242 and 244.

Figure 3:
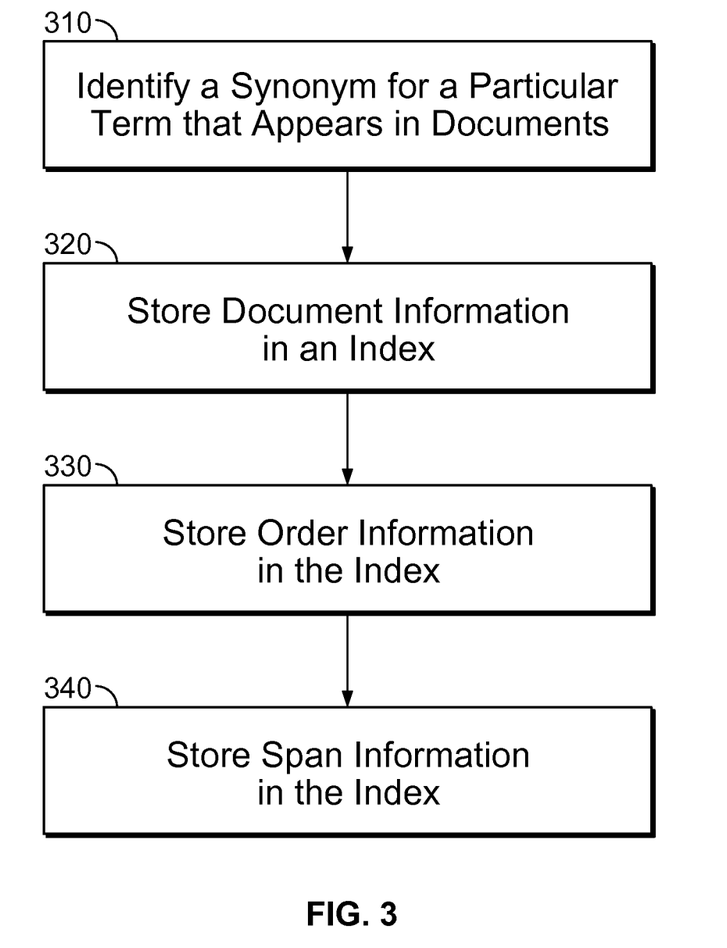
FIG. 3 is a flow diagram illustrating an example process for storing substitution information in an index.

FIG. 3 is a flow diagram illustrating an example process for storing substitution information in an index. The process 300 can be performed by a computer system including one or more computers, such as, for example, the search system 110, as shown in FIG. 1.

The system identifies a substitute term for a particular term that appears in one or more documents (310). In some implementations, the system identifies substitute terms for a particular term using the substitute term engine 180, as discussed in connection with FIG. 1. In some implementations, substitute term rules can be used to identify substitute terms for particular terms that appear in documents. For example, the system can use a substitute term rule that specifies that a term "new york city" is a substitute term for a query term "jersey state" to identify "jersey state" as a substitute term for the particular term "new york city."

The system stores document information in an index (320). In particular, once a substitute term is identified, the system can store, in an index associated with the documents, document information indicating the substitute term for the particular term, the particular term, and references to the documents that contain the particular term.

Particular terms having more than one word can be stored in the index 240. For example, the system can store, in an index, the substitute term "jersey state" for the particular term "new york city," the particular term "new york city," and a document "Document A" that contains the particular term "new york city."

In some implementations, substitute terms that include more than one word can be stored in the index using separate index entries for each word in the substitute term. Thus, the substitute term "jersey state" can be stored, in the index, using two separate index entries, with one entry for the word "jersey" and one entry for the word "state." Each index entry can include a particular word of the substitute term (e.g., "jersey"), the particular term, references to documents that include the particular term, and substitution information for substituting the substitute term for the particular term in the documents in which that particular term occurs (e.g., order information, span information, or both).

The substitute term, the particular term, and references to documents that contain the particular term, can be stored in a way that provides a correspondence between the substitute term and the documents that contain the particular term, such that a look up of the substitute term, in the index, can identify the names of the documents that contain the particular term. For example, based on this correspondence, the document "Document A" that contains the particular term "new york city" can be identified when query terms "jersey state" match a substitute term "jersey state" for the particular term "new york city."

The system stores order information for performing the substitution in an index associated with the document (330). In some implementations, the identified substitute term of the particular term includes n words, where n is greater than 1, and the system stores, for each of the n words of the identified substitute term, data indicating an order of the word within the n words of the substitute term.

For example, the index entries for the words "jersey" and "state" can include data indicating an order of the word within the substitute term "jersey state." The index entry for the word "jersey" can indicate that instances of the particular term "new york city" occurring in a document are substituted with the word "jersey" at order 1, since "jersey" is the first word in the substitute term "jersey state." Similarly, the index entry for the word "state" can indicate that instances of the term "new york city" occurring in a document are substituted with the word "state" at order 2, since "state" is the second word in the substitute term "jersey state."

The system stores span information for performing the substitution in an index associated with the document (340). In some implementations, the particular term that occurs in the document includes n words, and where n is greater than 1, and the system stores substitution information indicating that the substitute term spans the n words of the particular term. The span of a particular term can indicate the number of words of the particular term that will be substituted by a substitute term for the particular term.

For example, the index entries for the words "jersey" and "state" can include data indicating that substitute term "jersey state" spans three words of the particular term "new york city." In this example, instances of the particular term "new york city" will be substituted with the substitute term "jersey state," since the substitution of the particular term "new york city" with the substitute term "jersey state" spans three words.

The combination of the index entries for "jersey" and "state" specify that the particular term "new york city" is substituted by the term "jersey state," where the substitution spans three words. In effect, instances of a term "new york city" occurring in a document can be substituted by the substitute term "jersey state," the substitution spanning three words of the particular term.

A similar substitution can be achieved by storing the index entries for "jersey" and "state" as specifying that a particular term "new" is substituted by the term "jersey state," where the substitution spans three words. In effect, instances of a term "new," along with two words following the particular term "new," (e.g., "new york city") can be substituted by the substitute term "jersey state," the substitution spanning three words of the particular term "new."

In some implementations, a substitute term for the particular term is identified based in part on a document context of the particular term as the particular term appears in the document. In some implementations, the document context of the particular term is determined based on one or more terms that appear adjacent to the particular term.

For example, a particular term "gm" can have a first substitute term "genetically modified" that is substituted when the particular term appears in the context of "food." The particular term "gm" can also have a second substitute term "german motors" that is substituted when the particular term appears in the context of "cars." In determining whether to store, in an index associated with a document, the first substitute term or the second substitute term, the system can use the context of the particular term "gm" as it appears in the document. For example, if the particular term "gm" appears in the document as "efficient gm cars," then the system can store, in the index, the second substitute term, since the term "gm" is adjacent to the term "cars." In another example, if the particular term "gm" appears in the document as "gm food plants," then the system can store, in the index, the first substitute term, since the term "gm" is adjacent to the term "food."

Thus, for example, in processing a query for "efficient german motors plants," the system can look up the query terms "german motors" in an index and can identify documents that include the term "gm" in a context that is relevant to the query terms "german motors" (e.g., cars) while avoiding documents that include the term "gm" in a context that may not be relevant to the query terms "german motors" (e.g., food).

Figure 4:
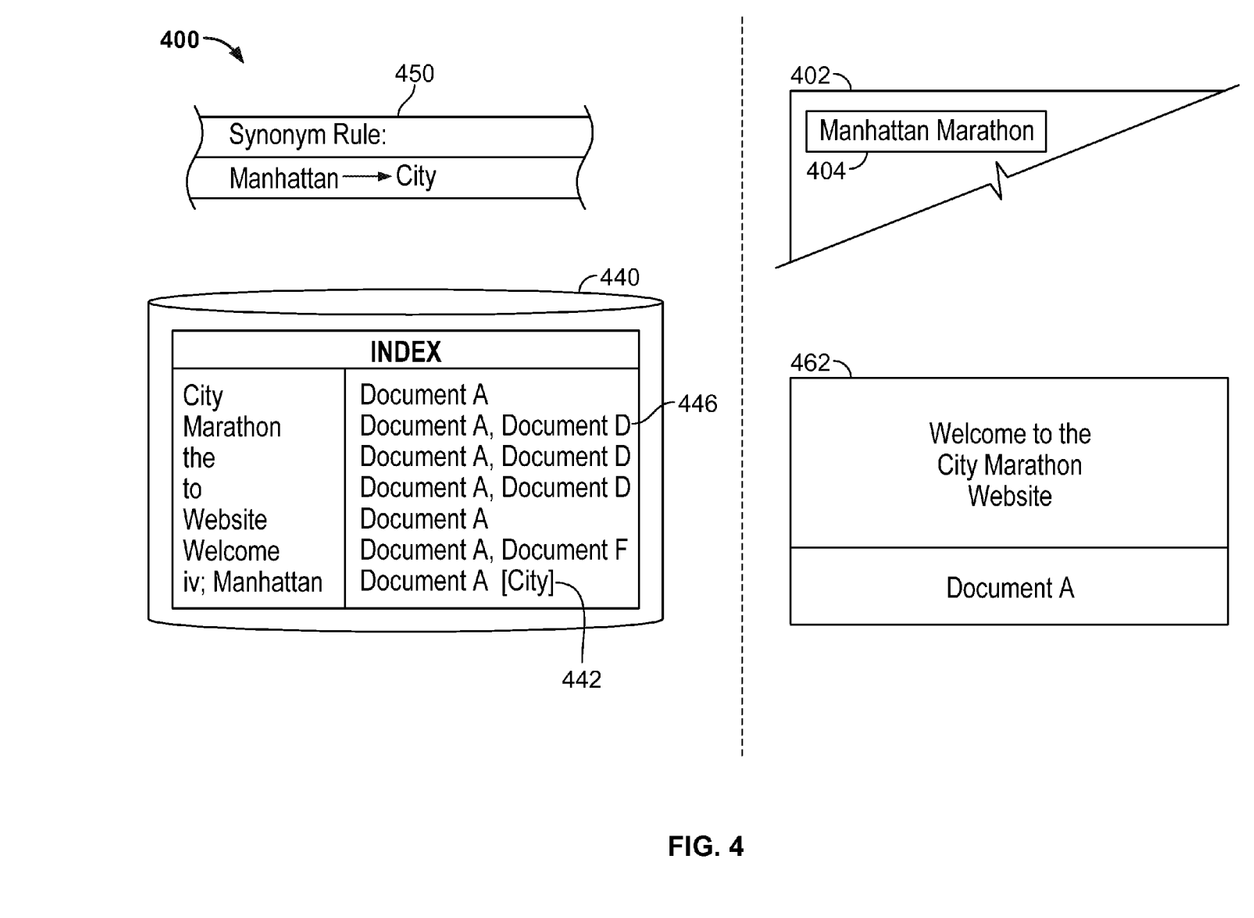
FIG. 4 is a view illustrating an example index entry, stored in an index, for substituting a particular term with a substitute term.

FIG. 4 is a view 400 illustrating an example index entry 442, stored in an index 440, for substituting a particular term ("city") that appears in a document 462 ("Document A") with a substitute term ("manhattan") for the particular term.

In FIG. 4, the substitute term "manhattan" is stored in the index 440 as an index entry 442. The system can use a substitute term rule 450 that specifies that the term "city" is a substitute term for a query term "manhattan" to identify "manhattan" as a substitute term for the particular term "city."

The index entry 442 indicates that a document "Document A" is responsive to a query term "manhattan." The index entry 442 also indicates that the particular term "city" is substituted by the substitute term "manhattan" in the document "Document A."

In particular, a search engine can look up the original query terms 404 ("manhattan marathon") in the index 440 to locate the index entry 442. The search engine can use the index entry 442 to identify the document "Document A" as being responsive to the query term "manhattan," where instances of the particular term "city" appearing in the document "Document A" are substituted by the substitute term "manhattan." As a result, the document "Document A" can be provided in response to the search query, even though the document makes no mention of the term "manhattan."

Figure 5:
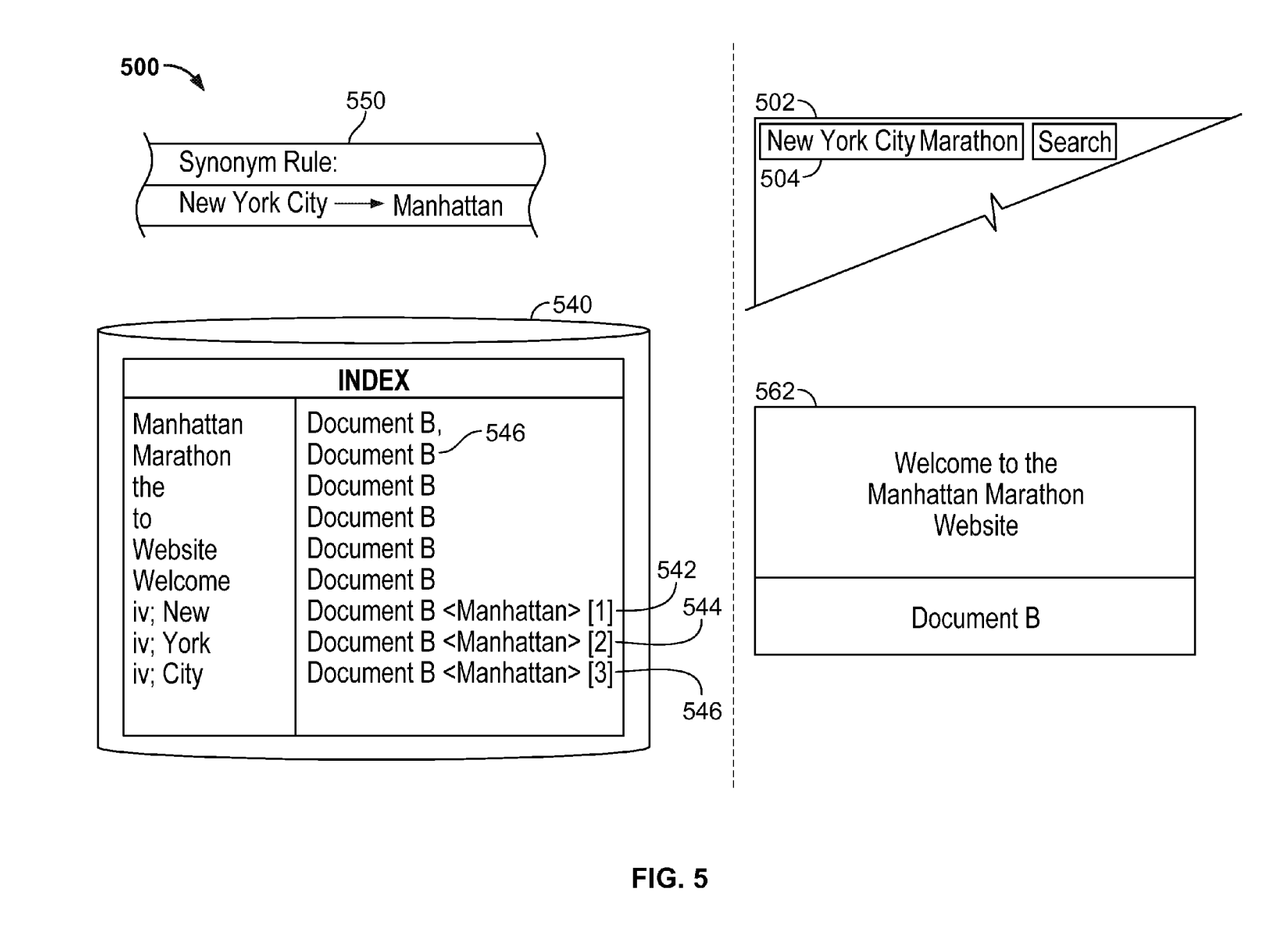
FIG. 5 is a view illustrating example index entries, stored in an index, for substituting a particular term with a substitute term that includes multiple words.

FIG. 5 is a view 500 illustrating example index entries 542, 544, and 546, stored in an index 540, for substituting a particular term ("manhattan") that appears in a document 562 ("Document B") with a substitute term ("new york city") that includes multiple words.

In FIG. 5, the substitute term "new york city" is stored in the index 540 as index entries 542, 544, and 546. The system can use a substitute term rule 550 that specifies that the term "manhattan" is a substitute term for a query term "new york city" to identify "new york city" as a substitute term for the particular term "manhattan."

The index entries 542, 544, and 546 indicate that a document "Document B" is responsive to a query term "new york city." The index entry 542 indicates that instances of the term "manhattan" that occur in the document "Document B" are substituted with the term "new" at order 1. Similarly, the index entry 544 indicates that instances of the term "manhattan" that occur in the document "Document B" are substituted with the term "york" at order 2. Finally, the index entry 546 indicates that instances of the term "manhattan" that occur in the document "Document B" are substituted with the term "city" at order 3.

In particular, a search engine can look up the original query terms 504 ("new york city marathon") in the index 540 to locate the index entries 542, 544, and 546. The search engine can use the index entries 542, 544, and 546 to identify the document "Document B" as being responsive to the query term "new york city," where instances of the particular term "manhattan" appearing in the document "Document B" are substituted by the substitute term "new york city." As a result, the document "Document B" can be provided in response to the search query, even though the document makes no mention of the term "new york city."

Figure 6:
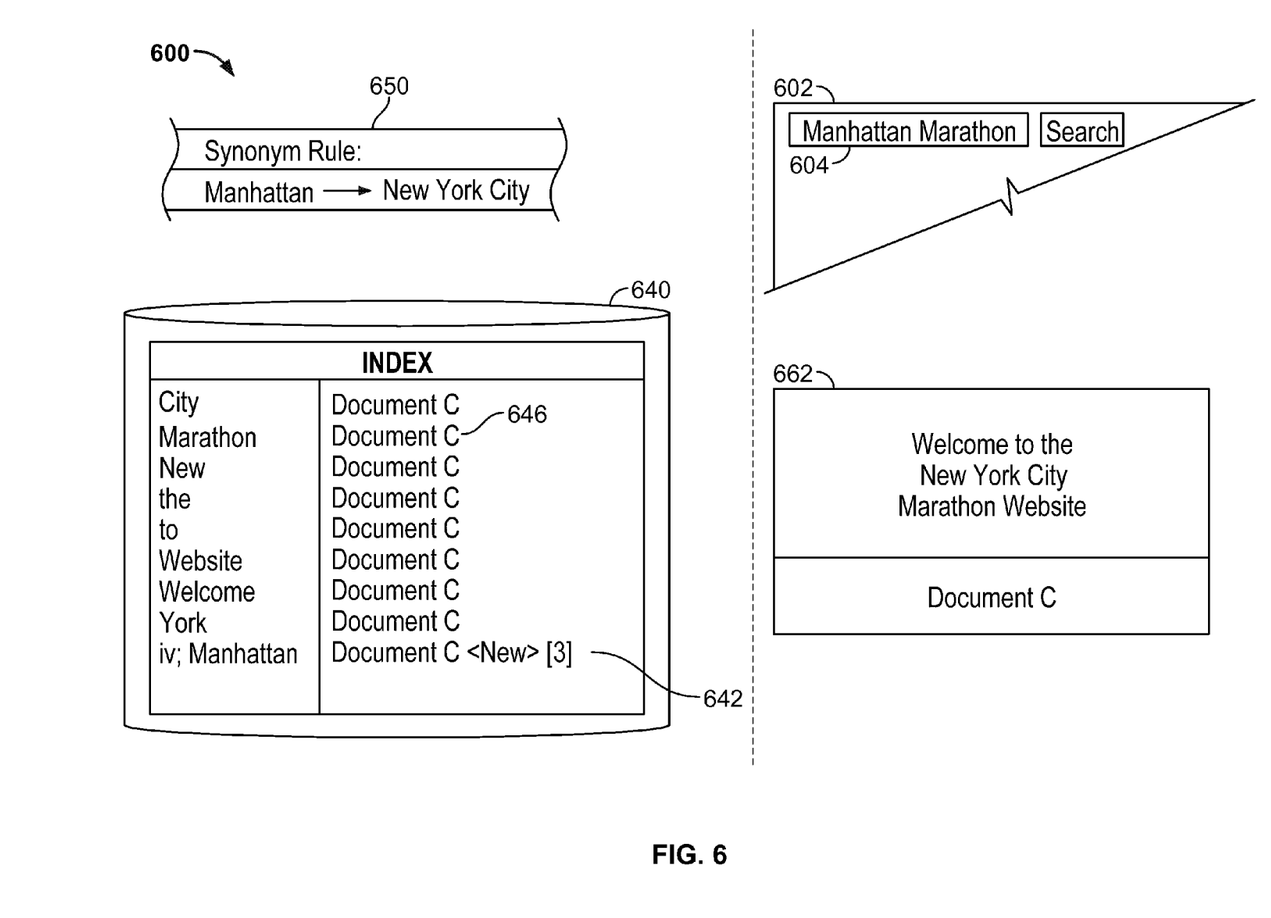
FIG. 6 is a view illustrating an example index entry, stored in an index, for substituting a particular term that includes multiple words with a substitute term.

FIG. 6 is a view 600 illustrating example an index entry 642, stored in an index 640, for substituting a particular term ("new york city") that includes multiple words with a substitute term ("manhattan").

In FIG. 6, the substitute term "manhattan" is stored in the index 640 as index entry 642. The system can use a substitute term rule 650 that specifies that a term "new york city" is a substitute term for a query term "manhattan" to identify "manhattan" as a substitute term for the particular term "new york city."

The index entry 642 indicates that a document "Document C" is responsive to a query term "manhattan." The index entry 442 also indicates that the particular term "new" is substituted, in the document "Document C," by the substitute term "manhattan," where the substitution spans three words.

In particular, a search engine can look up the original query terms 604 ("manhattan marathon") in the index 640 to locate the index entry 642. The search engine can use the index entry 642 to identify the document "Document C" as being responsive to the query term "manhattan," where instances of the particular term "new," in the document "Document C," are substituted by the substitute term "manhattan," where the substitution spans three words. For example, in the document "Document C," the substitute term "manhattan" can be substituted for the particular term "new york city." As a result, the document "Document C" can be provided in response to the search query, even though the document makes no mention of the term "new york city."

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   storing, in an index associated with a document, a particular term that occurs in the document, wherein the particular term comprises quantity m words, wherein the quantity m is greater than 1;
   identifying a substitute term of the particular term, wherein the substitute term comprises quantity n separate words, and wherein the quantity n is greater than 1; and
   in response to identifying the substitute term of the particular term, storing, in the index associated with the document, (i) each of the quantity n words of the substitute term of the particular term as a separate index entry, and (ii) for each respective index entry, data indicating the quantity m and data indicating a value between 1 and n inclusive, wherein the value reflects an order of the respective word within the quantity n words of the substitute term.

2. The method of claim 1, further comprising:
   storing, in the index associated with the document, a reference to the document in which the particular term occurs.

3. The method of claim 1, wherein the substitute term for the particular term is identified based in part on a document context of the particular term in the document.

4. The method of claim 1, further comprising:
   storing, in the index associate with the document, information indicating that the substitute term of the particular term (i) is a substitute term of the particular term, or (ii) is not a term that occurs in the document.

5. A computer storage medium encoded with instructions that when executed by one or more computers cause the one or more computers to perform operations comprising:
   storing, in an index associated with a document, a particular term that occurs in the document, wherein the particular term comprises quantity m words, wherein the quantity m is greater than 1;
   identifying a substitute term of the particular term, wherein the substitute term comprises quantity n separate words, and wherein the quantity n is greater than 1; and
   in response to identifying the substitute term of the particular term, storing, in the index associated with the document, (i) each of the quantity n words of the substitute term of the particular term as a separate index entry, and (ii) for each respective index entry, data indicating the quantity m and data indicating a value between 1 and n inclusive, wherein the value reflects an order of the respective word within the quantity n words of the substitute term.

6. The storage medium of claim 5, further comprising:
   storing, in the index associated with the document, a reference to the document in which the particular term occurs.

7. The storage medium of claim 5, wherein the substitute term for the particular term is identified based in part on a document context of the particular term in the document.

8. The storage medium of claim 5, further comprising:
   storing, in the index associate with the document, information indicating that the substitute term of the particular term (i) is a substitute term of the particular term, or (ii) is not a term that occurs in the document.

9. A system comprising:
   one or more computers and one or more storage devices storing instructions that are operable, when executed by the one or more computers, to cause the one or more computers to perform operations comprising:
   storing, in an index associated with a document, a particular term that occurs in the document, wherein the particular term comprises quantity m words, wherein the quantity m is greater than 1;
   identifying a substitute term of the particular term, wherein the substitute term comprises quantity n separate words, and wherein the quantity n is greater than 1; and
   in response to identifying the substitute term of the particular term, storing, in the index associated with the document, (i) each of the quantity n words of the substitute term of the particular term as a separate index entry, and (ii) for each respective index entry, data indicating the quantity m and data indicating a value between 1 and n inclusive, wherein the value reflects an order of the respective word within the quantity n words of the substitute term.

10. The system of claim 9, further comprising:
    storing, in the index associated with the document, a reference to the document in which the particular term occurs.

11. The system of claim 9, wherein the substitute term for the particular term is identified based in part on a document context of the particular term in the document.

12. The system of claim 9, further comprising:
    storing, in the index associate with the document, information indicating that the substitute term of the particular term (i) is a substitute term of the particular term, or (ii) is not a term that occurs in the document.

* * * * *